(12) United States Patent
Landry et al.

(10) Patent No.: US 12,337,284 B2
(45) Date of Patent: Jun. 24, 2025

(54) SPIRAL WOUND FILTRATION DEVICE AND METHODS OF MANUFACTURE

(71) Applicant: EMD Millipore Corporation, Burlington, MA (US)

(72) Inventors: Nathan Landry, Burlington, MA (US); Gregory Straeffer, Burlington, MA (US); Matthew Natale, Burlington, MA (US)

(73) Assignee: EMD Millipore Corporation, Burlington, MA (US)

( * ) Notice: Subject to any disclaimer, the term of this patent is extended or adjusted under 35 U.S.C. 154(b) by 236 days.

(21) Appl. No.: 17/292,981

(22) PCT Filed: Dec. 5, 2019

(86) PCT No.: PCT/US2019/064580
§ 371 (c)(1),
(2) Date: May 11, 2021

(87) PCT Pub. No.: WO2020/123243
PCT Pub. Date: Jun. 18, 2020

(65) Prior Publication Data
US 2022/0001334 A1    Jan. 6, 2022

Related U.S. Application Data

(60) Provisional application No. 62/780,634, filed on Dec. 17, 2018, provisional application No. 62/780,689, (Continued)

(51) Int. Cl.
*B01D 65/00*    (2006.01)
*B01D 63/10*    (2006.01)

(52) U.S. Cl.
CPC ......... *B01D 65/003* (2013.01); *B01D 63/101* (2022.08); *B01D 63/103* (2013.01);
(Continued)

(58) Field of Classification Search
None
See application file for complete search history.

(56) References Cited

U.S. PATENT DOCUMENTS

| 3,872,014 A | 3/1975 | Schell |
| 4,842,736 A * | 6/1989 | Bray ............... B01D 63/10 |
| | | 210/321.74 |

(Continued)

FOREIGN PATENT DOCUMENTS

| CN | 1676203 A | 10/2005 |
| CN | 102170961 A | 8/2011 |

(Continued)

OTHER PUBLICATIONS

Japanese communication, with English translation, dated Sep. 12, 2023 in corresponding Japanese patent application No. 2022-155390.

(Continued)

*Primary Examiner* — Hayden Brewster
(74) *Attorney, Agent, or Firm* — Nields, Lemack & Frame, LLC (57) ABSTRACT

A spiral wound membrane module, comprising a perforated core having an axially extending internal bore; at least one membrane packet comprising a folded membrane sheet defining a first outer face, a first inner face, a second outer face and a second inner face, the fold of the folded membrane sheet being a leading end of the membrane packet; a feed sheet positioned between the first and second inner faces so as to be sandwiched by the folded membrane sheet; a first permeate screen adjacent the first outer face of the membrane sheet defining a first permeate channel; a second permeate screen adjacent the second outer face of the membrane sheet defining a second permeate channel; and a fluid impermeable support coupled to the leading edge of the (Continued)

membrane packet. Also disclosed is a method of manufacturing the spiral wound membrane module.

7 Claims, 5 Drawing Sheets

Related U.S. Application Data filed on Dec. 17, 2018, provisional application No. 62/779,867, filed on Dec. 14, 2018, provisional application No. 62/779,860, filed on Dec. 14, 2018.

(52) U.S. Cl.
CPC .. *B01D 2313/041* (2022.08); *B01D 2313/042* (2022.08); *B01D 2323/42* (2013.01)

(56) References Cited

U.S. PATENT DOCUMENTS

| | | | |
|---|---|---|---|
| 5,034,126 | A | 7/1991 | Reddy et al. |
| 6,068,771 | A | 5/2000 | McDermott et al. |
| 8,668,828 | B2 | 3/2014 | Knappe et al. |
| 2005/0077229 | A1 | 4/2005 | Ishii |
| 2005/0103423 | A1 | 5/2005 | Ide et al. |
| 2009/0314713 | A1 | 12/2009 | Shelby et al. |
| 2010/0096309 | A1 | 4/2010 | Beauchamp et al. |
| 2010/0140161 | A1* | 6/2010 | Haynes ............... B01D 65/003 156/227 |
| 2013/0292034 | A1 | 11/2013 | Wang et al. |
| 2014/0076790 | A1 | 3/2014 | Wang et al. |
| 2018/0354831 | A1 | 12/2018 | Herron et al. |
| 2020/0047129 | A1 | 2/2020 | Tasaki et al. |

FOREIGN PATENT DOCUMENTS

| | | |
|---|---|---|
| CN | 102806014 A | 12/2012 |
| CN | 108698858 A | 10/2018 |
| JP | 10-137558 A | 5/1998 |
| JP | 2003-320223 A | 11/2003 |
| JP | 2005-103516 A | 4/2005 |
| JP | 2018-176040 A | 11/2018 |
| KR | 10-2005-0033012 A | 4/2005 |
| KR | 10-2008-0012822 A | 2/2008 |
| WO | 2000/047311 A1 | 8/2000 |
| WO | 2006/045191 A1 | 5/2006 |
| WO | 2012/091871 A1 | 7/2012 |

OTHER PUBLICATIONS

Korean communication, with English translation, dated Aug. 19, 2022 in corresponding Korean patent application No. 201380021431. X.

Chinese communication, with English translation, dated Jul. 26, 2022 in corresponding Chinese patent application No. 201980082409. 3.

European communication dated Jul. 8, 2022 in corresponding European patent application No. 19895395.2.

International Search Report and Written Opinion mailed Jan. 30, 2020 in corresponding PCT application No. PCT/US2019/064580.

Japanese communication, with English translation, dated Mar. 22, 2022 in corresponding Japanese patent application No. 2021-533314.

* cited by examiner

NO WEDGE
FIG. 1 (PRIOR ART)

WITH WEDGE
FIG. 2

SPIRAL WOUND FILTRATION DEVICE AND METHODS OF MANUFACTURE

This application claims priority of: U.S. provisional patent application Ser. No. 62/779,860 filed Dec. 14, 2018, U.S. provisional patent application Ser. No. 62/779,867 filed Dec. 14, 2018, U.S. provisional patent application Ser. No. 62/780,634 filed Dec. 17, 2018 and U.S. provisional patent application Ser. No. 62/780,689 filed Dec. 17, 2018, all of the disclosures of which are hereby incorporated by reference.

FIELD

This disclosure relates generally to spirally wound membrane filter elements or modules and methods for making the same. More specifically, disclosed is a spirally wound filter module in which the module includes one or more features to provide adhesive migration control, to prevent feed channel geometry from changing, and to minimize or eliminate voids, thereby resulting in more consistent manufacturing processes and consistent reproducibility of the spirally wound filter. A manufacturing method is also disclosed, which is based on a novel assembly process whereby the membranes and screens are first wound around the permeate drainage core to form the spiral, then adhesive is applied to form the permeate envelopes, affix the spiral to the core, seal the circumference, and fill the annulus to a housing or provide a pressure-containing circumferential shell.

BACKGROUND

Spirally wound filter modules are commonly used in filtration, including ultrafiltration and reverse osmosis. Typically, such modules are manufactured by spirally winding a plurality of membrane sheets, spacer materials and permeate sheets around a perforated hollow core or mandrel, which may then be centrally located in a housing or cartridge.

More specifically, spiral wound filtration modules are multi-layered devices that may include one or more permeate spacers, which may be a porous fabric, one or more membrane sheets, and one or more feed screens or spacers. The module may be constructed by spirally winding the one or more membranes, feed spacers and permeate screens around a permeate core, tube or mandrel which has a plurality of openings such as slots or holes therein communicating with a central bore to collect the permeate. An adhesive may be used to fix the resulting assembly in place around the mandrel. The resulting module may be positioned in a housing capable of withstanding typical operating pressures.

Some spiral wound filtration modules may include a plurality of leaves, each having a layer of a permeate sheet or screen, which may be a porous fabric material, sandwiched between two membrane sheets. The membrane sheets may be folded in half with a feed screen positioned between the two halves to form a membrane packet. The membrane packets and permeate sheet are wound around a mandrel or core which has openings in it to collect permeate. Modules with one and four leaves are typical but can consist of any number of leaves. For example, a 0.1 $m^2$ module may have a single leaf; a 0.5 $m^2$ module may have four leaves and larger spiral devices with membrane areas greater than 1 $m^2$ (e.g., 2.0 $m^2$) may have up to 16 leaves.

Figure 1:
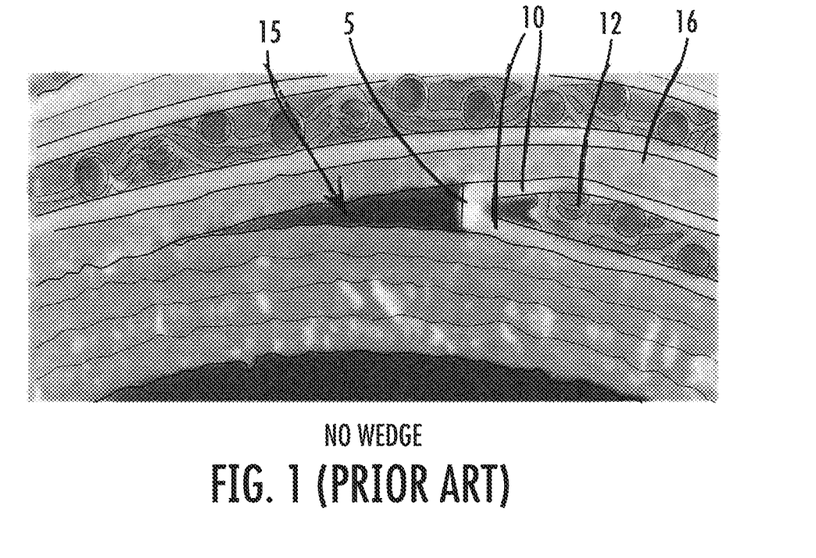
FIG. 1 is a photograph showing a wedge-shaped void formed between a membrane and a feed screen of a spiral wound filtration device in accordance with the prior art.

However, spiral wrapping of the membrane packet results in a wedge-shaped void in front of the leading edge of the packet (see FIG. 1). In addition, the membrane can back away from the feed screen, also resulting in a gap or void in front of the feed screen (FIG. 1) that causes bypass flow to occur around the screen. This bypass flow reduces performance.

In addition, adhesive is manually introduced into the assembly to bind the layers together and to the perforated core, and this process often results in an irregular adhesive border, which in turn can cause variability in membrane area as well as a higher risk of human error caused integrity failures.

It therefore would be desirable to mitigate or eliminate these issues and improve the performance of the spiral wound filtration modules.

SUMMARY

The problems of the prior art have been overcome by embodiments disclosed herein, which relate to spiral wound filtration modules and methods of manufacturing the same. In certain embodiments, the filtration module includes a support, such as a wedge-shaped support, that functions to eliminate the void or voids that otherwise forms as a result of the winding operation during assembly, and functions to eliminate the void or voids as the membrane moves away from the feed screen. In certain embodiments, the support is positioned to occupy some or all of the region where such a void would normally form, and supports the membrane and screen that is radially wound outwardly from the core. This prevents the feed channel of every layer above from changing geometry at higher pressures. This added benefit keeps the feed channel geometry consistent throughout the device, increasing performance and reducing pressure drop variability. Furthermore, crease, cracks and fold failures of the leading edge of the membrane packet are a well-known mode of loss of retention in spirals, and a support coupled to the leading edge of the membrane packet can reduce chance of failure of the lead edge in operation.

A further advantage of the support is realized when adhesive is drawn or driven into the device during a potting process. The support prevents deleterious potting adhesive migration into the device through the wedge gaps, particularly where multi-leaf spiral modules are involved. The presence of the support also reduces the amount of adhesive required.

In certain embodiments, disclosed is a filter module formed by spirally winding multiple layers of materials around a core to form a generally cylindrical construction having two opposing spiral end surfaces. The layers are adhered along the lengthwise and widthwise edges so that, in use, unfiltered fluid supplied to the unit through one spiral end surface must pass through, or tangentially across a membrane layer or layers before it passes out of the unit through the opposing spiral end surface. Sealing arrangements are provided at each spiral surface of the wound filter to assure that incoming fluid passes through a membrane surface before leaving the unit. In certain embodiments, the multi-layer material includes one or more membrane sheets, one or more feed screens and one or more permeate sheets or screens. The one or more membrane sheets may be folded once along its length to form a leaf with two halves integrally joined together, and a feed screen positioned or sandwiched between the two halves to form a membrane packet. The assembly forms spirally wound permeate and concentrate flow channels. A support is positioned at the location of the membrane packet fold, which is its leading edge during winding, to eliminate the void region that otherwise forms upon winding the packet and permeate sheet about the core.

To filter product, the product may be introduced at one end face of the spiral wound membrane module under pressure, and flows axially through the feed screens, where it then flows tangentially across the membrane and a portion of it flows through the membranes where it reaches the permeate channels defined between each membrane and an adjacent permeate sheet. The permeate then flows to the perforated core and is ultimately removed from the module.

In certain embodiments, disclosed is a spiral wound membrane module, comprising a perforated core having an axially extending internal bore; at least one membrane packet comprising a folded membrane sheet defining a first outer face, a first inner face, a second outer face and a second inner face, the fold of said folded membrane sheet being a leading end of the membrane packet; a feed sheet positioned between said first and second inner faces so as to be sandwiched by the folded membrane sheet; a first permeate screen adjacent said first outer face of said membrane sheet defining a first permeate channel; a second permeate screen adjacent said second outer face of said membrane sheet defining a second permeate channel; and a fluid impermeable support coupled to said leading edge of said membrane packet.

In some aspects, there are a plurality of membrane packets, each having a leading edge and a fluid impermeable support coupled to each respective leading edge.

In some aspects, the impermeable support is wedge-shaped.

In some aspects, the impermeable support is non-uniformly deformable in such a manner as to fill a non-uniform void space.

In some aspects, the module is cylindrical in cross-section and has an outer surface of cured adhesive.

In certain embodiments, a method of potting a spiral wound membrane is disclosed, the method comprising positioning the spiral wound membrane into sealing relation with a mold cavity; introducing an adhesive into the mold cavity; applying a vacuum to the permeate core, tube or mandrel, whereby the vacuum drives the adhesive into the permeate channels and around the outer perimeter of the core; and allowing the adhesive to cure. Where a wrap of permeate screen is placed around the core, the adhesive is also driven into that permeate screen to anchor the spiral to the core. The spiral in this method comprises only bordered feed screens, designed to prevent intrusion of adhesive into the feed channel during the potting process; they contain impermeable borders on all sides corresponding to the three sides of the permeate envelope. The side borders are made narrower than the permeate envelope side seams; thus, when they are removed (e.g., cut off) after the spiral adhesive is cured, the feed channel is opened for tangential flow, while the permeate envelope remains sealed. The feed screen may also have four borders, wherein the fourth border is on the lead edge of the feed screen (near fold in the membrane packet); it may prevent damage of the lead edge membrane from the feed screen.

DETAILED DESCRIPTION

A more complete understanding of the components, processes and devices disclosed herein can be obtained by reference to the accompanying drawings. The figures are merely schematic representations based on convenience and the ease of demonstrating the present disclosure, and is, therefore, not intended to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

In certain embodiments, the filtration device is a filtration module having a fluid inlet, a fluid outlet spaced from the fluid inlet, a permeate outlet, a central core having a plurality of openings and an axially extending bore along its entire length, one or more membrane packets, in each of which is sandwiched a feed sheet or screen which may be a polyolefin sheet such as polypropylene, and one or more permeate sheets such as one or more polyester screens that may be epoxy impregnated to provide it with sufficient strength to withstand the typical operating pressures encountered during use. The feed screen provides space for the flow of feed between the opposing membranes that sandwich it. The permeate sheets provide fluid pathways for permeate flow to the perforated core. The membrane packet or packets and permeate sheet or sheets are wound in a spiral configuration about the core. The membrane within each membrane packet may be a single layered or multilayered membrane, and may be used for filtration of unwanted materials including contaminants such as infectious organisms and viruses, as well as environmental toxins and pollutants that could be removed by size exclusion and chemical or physical adsorption of the combination thereof. The membrane may be comprised of any suitable material, including, but not limited to polyether sulfone, polyamide, e.g., Nylon, cellulose, polytetrafluoroethylene, polysulfone, polyester, polyvinylidene fluoride, polypropylene, a fluorocarbon, e.g. poly (tetrafluoroethylene-co-perfluoro(alkyl vinyl ether)), polycarbonate, polyethylene, glass fiber, polycarbonate, ceramic, and metals. It may be a microfiltration, ultrafiltration or reverse osmosis membrane. Ultrafiltration membranes are particularly preferred.

One suitable spiral wound filtration device is the Pellicon® capsule commercially available from MilliporeSigma. The Pellicon® capsule is a single use, single pass tangential flow filtration device that uses Ultracel® composite, solvent-resistant membranes and is suitable for bioprocessing of antibody-drug conjugates and monoclonal antibodies. Those skilled in the art will appreciate that other spiral wound devices are also suitable, including re-usable and/or multiple pass tangential flow devices.

Typically, a spiral wound device is manufactured by winding one or more packets made up of a folded membrane and feed screen sandwiched by the folded membrane, and one or more permeate sheets, into the device around a perforated core or mandrel. In some embodiments, one full circumferential wrap of a permeate sheet may be first wound around the core to provide an adequate fluid pathway for permeate fluid to travel to the openings in the core. Since the membrane packet is generally thicker than the other materials, the winding operation of the membrane packet creates a wedge-shaped void region in front of the leading edge 5 of the membrane packet as it winds over itself, as can be seen in FIG. 1.

More specifically, FIG. 1 illustrates the folded over leading edge 5 of a membrane 10 with a feed screen 12 sandwiched by the folded over membrane 10. The folded over membrane 10 with a feed screen sandwiched within the fold comprises a membrane packet 14. As the membrane packet 14 is wound over itself, void region 15 forms as seen just to the left of the membrane packet leading edge 5, and this void region 15 is typically generally wedge-shaped. To eliminate this void region 15, it has been conventionally filled with excess adhesive to seal it, which is a tedious manual process and not always successful. For example, the subsequent compression of the winding tension, and nip forces, can cause the adhesive to be squeezed out of the space, again creating a void region and possibly deforming the areas around it. This creates a bypass region for fluid flow and reduces product yield and overall performance of the device.

Figure 2:
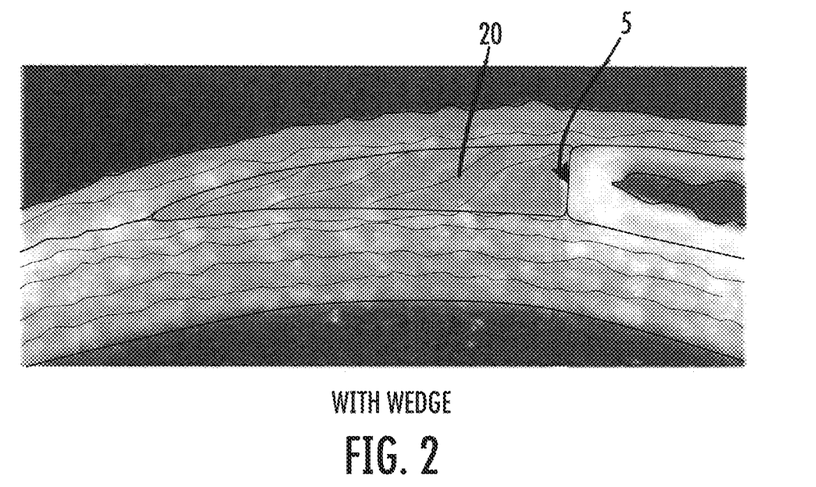
FIG. 2 is a photograph showing a support inserted in the void formed between a membrane and permeate screen, and between a membrane and a feed screen, of a spiral wound filtration device in accordance with certain embodiments.
Figure 4:
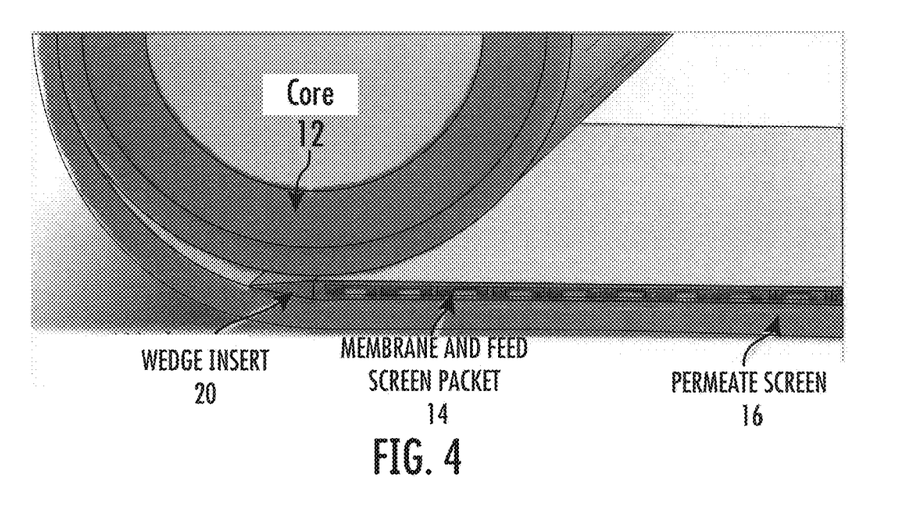
FIG. 4 is a diagrammatic illustration of a support and membrane packet during a winding operation.

In accordance with certain embodiments, a support 20 is coupled to the leading edge 5 of the membrane packet so that upon winding of the packet, the support 20 occupies the space where the void region 15 would otherwise form, as shown in FIGS. 2 and 4. The size and shape of the support 20 can be determined based on prior experience of the size and shape of the void region 15 formed during a typical winding operation for a given size filter module. Support 20 can be coupled to the leading edge 5 using adhesive means, ultrasonic welding means, heat welding means, ultra-violet glue means or any other suitable means.

Figure 3:
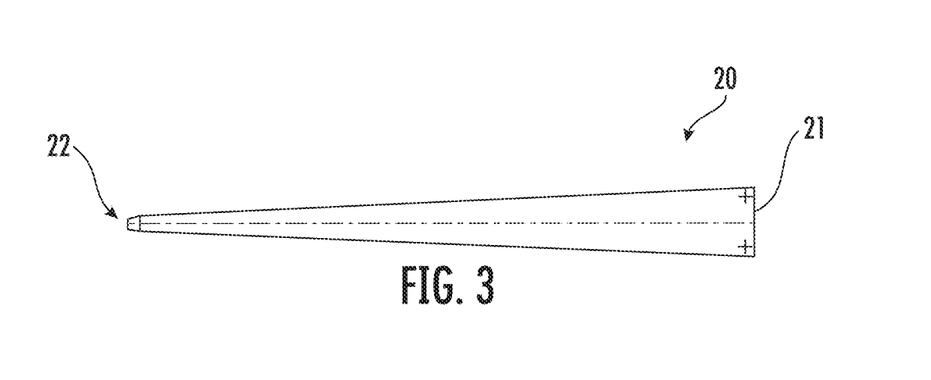
FIG. 3 is a cross-sectional view of a support in accordance with certain embodiments.

FIG. 3 illustrates a preferred embodiment of the support 20, where a wedge-shaped support 20 is shown. Upon winding of the membrane packet 14, the support 20 will occupy the region where a void region 15 would normally form, and a fluid bypass region is minimized or avoided, as the membrane 10 is forced to remain in contact with the feed screen 12.

In addition, in accordance with certain embodiments as set forth below, during the potting process the device is submerged in adhesive, and a vacuum is pulled on the permeate fluid flow channel. If the void 15 is present, adhesive migrates into the permeate fluid flow channel, causing blockage of the channel. The support 20 thus also functions to mitigate or eliminate such adhesive migration, and reduces the amount of adhesive necessary to seal the area. This also results in a more uniform permeate channel seam near the core or mandrel 12 and ultimately a more uniform membrane area within each spiral wound filtration module.

Figure 6:
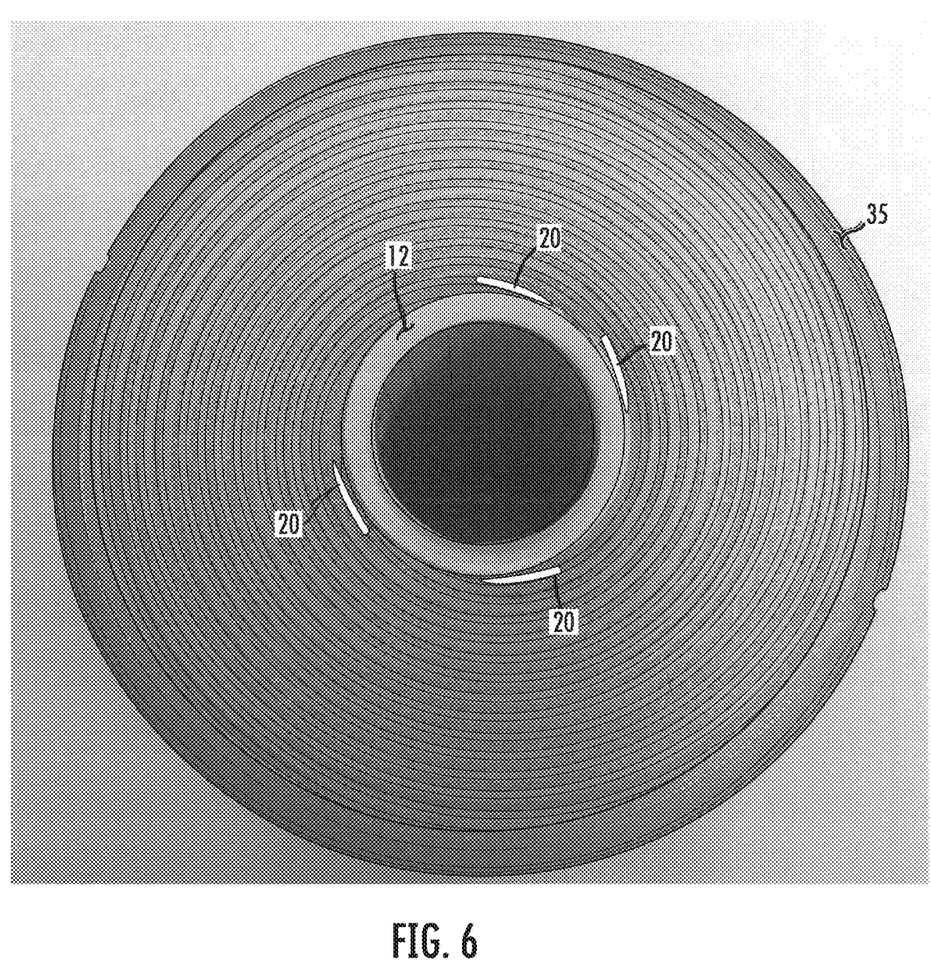
FIG. 6 is a photograph of a top view of a spiral wound membrane module in accordance with certain embodiments.

In certain embodiments, the support 20 is attached to the leading edge 5 of the membrane packet 14, such as at seam locations, with a suitable adhesive (e.g., an epoxy or polyurethane). Where multiple membrane packets 14 are wound on a single core, e.g., in a multi-leaf assembly, each membrane packet 14 may have a support 20 attached to its leading edge 5. For example, FIG. 6 illustrates a four-leaf assembly, and consequently there are four supports 20 visible radially outwardly from the central perforated core 12.

Figure 8:
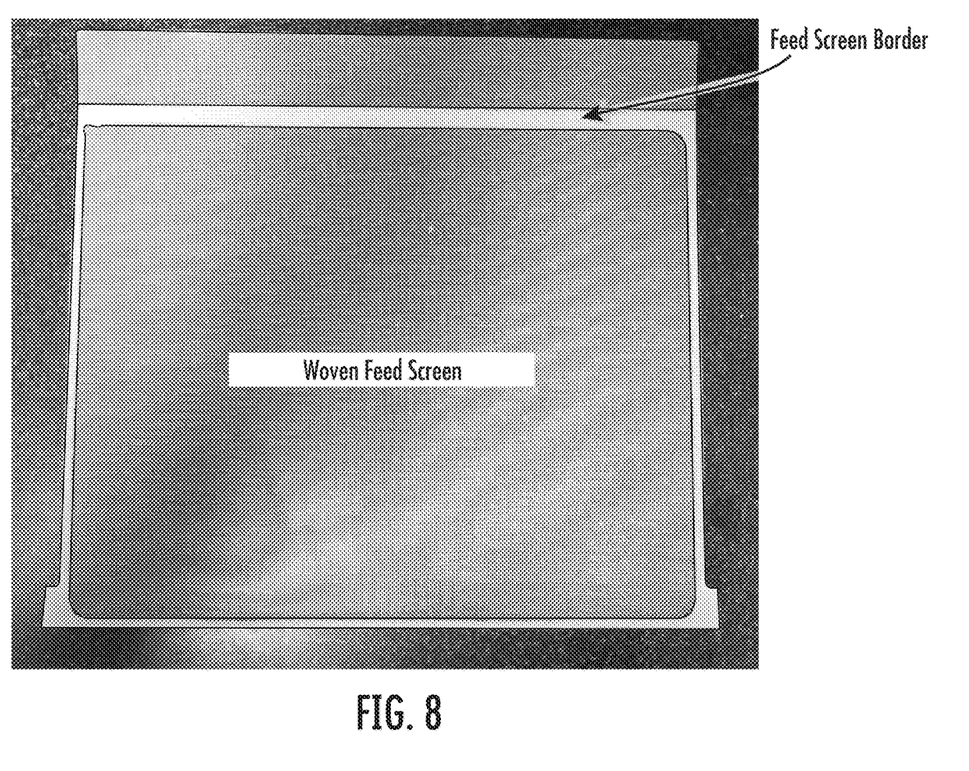
FIG. 8 is a photograph of a feed screen with four borders in accordance with certain embodiments.

In some embodiments, the support 20 is wedge-shaped to match the anticipated void that forms in the absence of the support 20. In some embodiments, the thicker end 21 of the support 20 is 0.031 inches thick, and tapers to the thin edge 22 of the support 20 which is 0.003 inches thick, although those skilled in the art will appreciate that the size is not critical, since the support 20 is compressible and will conform to the shape of the void. The thin edge 22 may have corners that are radiused or rounded to eliminate sharp edges that could tear the materials that it comes into contact with. The thicker end 21 of the support 20 may be fixed to the leading end 5 of the membrane packet with a suitable adhesive. In certain embodiments, the support 20 is elongated and extends the entire length of the membrane packet 14, as best seen in FIG. 8. In other embodiments, individual supports 20 may be positioned at only the opposite faces of the membrane packet 14 to block adhesive intrusion into the permeate channel, and not extend the entire length of the membrane packet 14. In certain embodiments, the support 20 is made of a solid, fluid impervious material not deleterious to the filtration operation to be carried out with the module, and capable of providing an adequate seal for vacuum seals on the mold used to introduce adhesive, as discussed in greater detail below. Suitable materials include thermoplastic elastomers, such as Pebax 5533 SA01 Med Pantone 298C. Preferably the material has sufficient flexibility to conform to the shape of the core 12.

Once the support 20 is fixed to the leading edge 5 of the membrane packet 15, the membrane packet 15 may be tightly wound under tension about the core 12 together with the permeate screen 16 (FIG. 4) and adhesive to form a spirally wound assembly. As the support 20 is wound in, it becomes sandwiched on either side by the permeate screen 14, which holds the support 20 in place until adhesive is applied to fix it in position. Because the leading edge 5 of the membrane packet 14 is supported by the support 20, the membrane 10 stays in contact with the feed screen 12 and is prevented from collapsing during a nip roller step, which removes the adhesive from the area and leads to a deleterious fluid bypass.

However, binding the assembly with adhesive during winding is somewhat variable, and is prone to gap formation which can lead to device failure.

Figure 7:
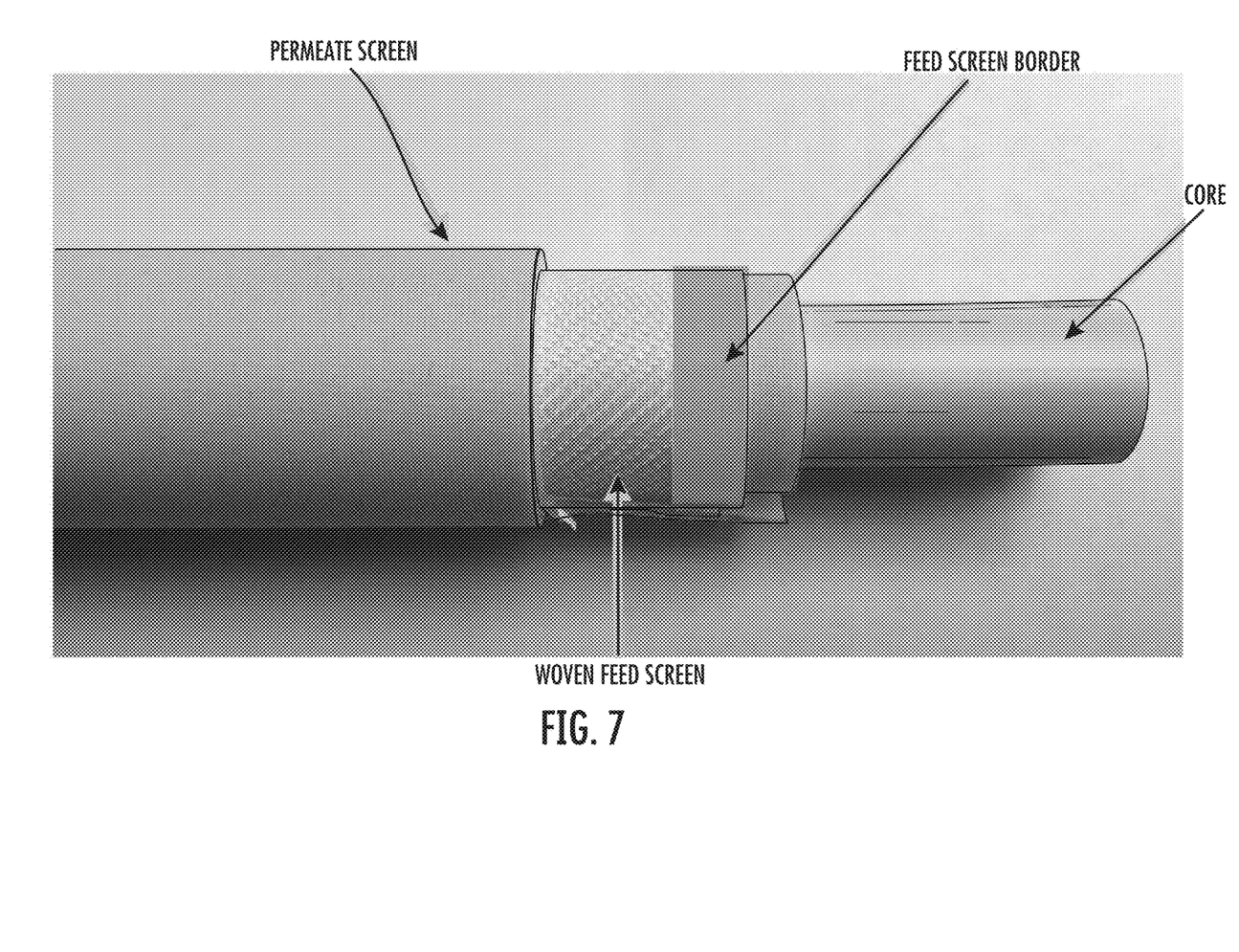
FIG. 7 is a photograph of a module with a feed screen having a border in accordance with certain embodiments.

Accordingly, in accordance with certain embodiments, the assembly can be bonded together with the use of a driving force such as a vacuum, or some pressure differential, to distribute the generally low-viscosity adhesive into the permeate sheet 14 uniformly to create a robust and uniform seam without the variability that results with manually made seams. In order to prevent potting adhesive form entering the feed channel during the potting process, a fluid impermeable feed screen border may be used as shown in FIG. 7. The feed screen border also prevents any feed flow from reaching any membrane outside of the border. This effect defines the effective membrane area, greatly reducing membrane area variability. Applying a feed screen border on the leading and trailing edge restricts the flow to membrane area only inside these edges, and thus defines the active membrane length for each membrane packet, which also improves feed channel geometry and permeate channel geometry. In certain embodiments, at least three of the feed screen sides include fluid impermeable borders to prevent adhesive from entering feed channels during potting. In some embodiments, one of the fluid impermeable borders is on the feed face, one is on the retentate face, and one is one the open tail end of the membrane packet (which is part of the circumference). The feed and retentate borders are removed to activate the spiral for feed flow. The feed tail border may remain. In some embodiments all four of the sides of the feed screen include fluid impermeable borders (FIG. 8) during potting, and again the feed and retentate borders are removed to activate the spiral for feed flow. Adhesive in the feed channel could lead to catastrophic loss of feed channel flow, or loss of integrity in operation by delaminating the membrane e.g. as the membrane moves apart under feed pressurization.

Once the potting adhesive is applied and cured, the border on the spiral inlet and outlet faces can be removed such as by cutting it away to reopen the feed channel. A viscous polyurethane adhesive (or thermoplastic, silicone or thermoplastic elastomer) is suitable for forming the solid impermeable feed screen border. In certain embodiments, during dispensing of the border adhesive onto the feed screen to form the fluid impermeable border, a film such as a polyethylene film may be used as a backing layer for the feed screen. In some embodiments, a second layer of film, e.g., polyethylene film, is also applied to the top of the feed screen after all of the adhesive has been deposited around the perimeter, and the resulting feed screen sandwich is compressed to distribute the adhesive into the shape of the border.

Figure 5:
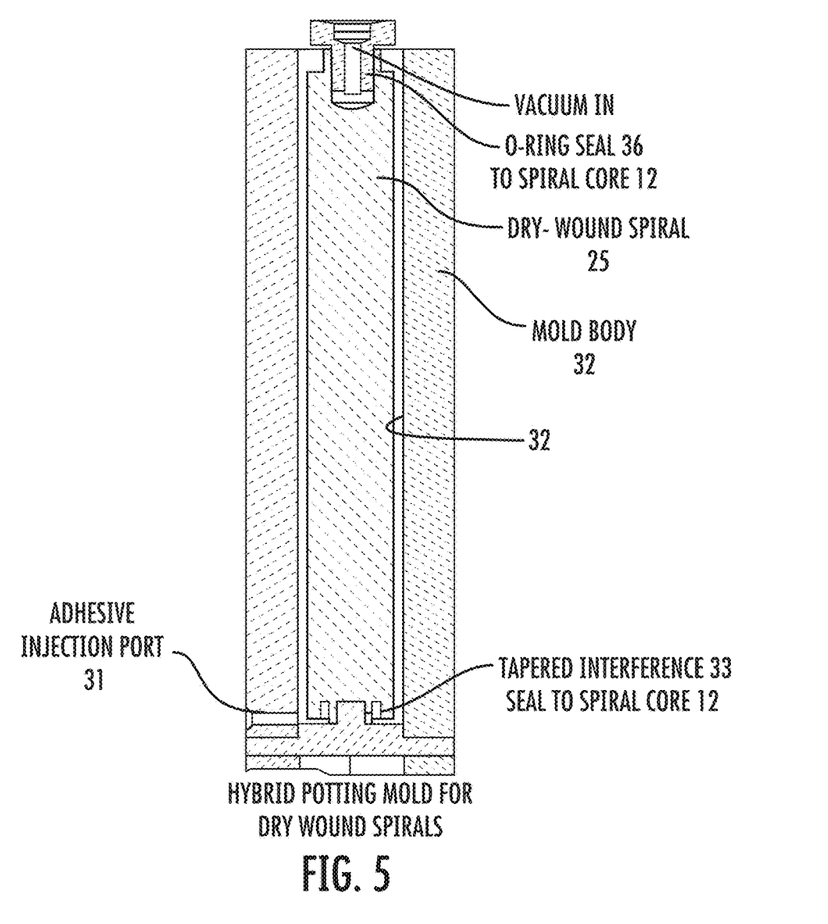
FIG. 5 is a cross-sectional view of a potting mold in accordance with certain embodiments.

FIG. 5 shows a suitable mold body 30 for potting a spirally wound assembly using vacuum as a driving force for distributing the adhesive. In certain embodiments, a dry would spiral assembly 25 is placed in the mold body 30 having an adhesive injection port 31 in fluid communication with an interior mold body cavity 32 in which the dry wound spiral assembly 25 is positioned. Preferably the adhesive injection port 31 is located at or near the bottom of the mold body 30, so that the adhesive flows upwardly upon the application of a driving force so that any entrapped air is removed during filling. In some embodiments, the perforated core 12 of the dry wound spiral assembly 25 is placed in sealing relation with a tapered, or O-ring interface 33 of the mold body 30. O-ring seals 36 or the like may be provided at the opposite end of the mold body 30 to ensure that the dry wound spiral assembly 25 is in sealing relation with the mold body 30, so that upon the application of vacuum, there are no leaks.

In some embodiments, a suitable potting adhesive, such as an epoxy or a polyurethane, is introduced into the injection port 31, and a vacuum is applied at the vacuum inlet 40 to drive the adhesive into the permeate screen creating all necessary device seams, and around the spiral assembly 25 to completely envelope the assembly 25. Suitable vacuum levels range from 1-15 in Hg from 1-300 seconds. Once the adhesive cures, the device is covered in an annular hard shell reinforced with permeate screen 35 (FIG. 6), which resists expansion under high pressure drop situations, for example up to 100 psig. Such expansion can open the feed channel geometry and lead to a reduction in device performance.

In some embodiments, the mold body 30 can be configured so that certain features are formed on the outer surface of the cured adhesive, such as an annular ring for receiving an O-ring in the event the formed spiral assembly is used as a stand-alone module, i.e., without any outer housing or pressure vessel. These features may also be machined.

In some embodiments, the mold can be a housing that forms part of the final product, such as a plastic housing inside of which the spiral wound filter is positioned.

The device is sterilizable such as by steam, ethylene oxide gas or radiation such as beta or gamma radiation.

While various aspects and embodiments have been disclosed herein, other aspects, embodiments, modifications and alterations will be apparent to those skilled in the art upon reading and understanding the preceding detailed description. The various aspects and embodiments disclosed herein are for purposes of illustration and are not intended to be limiting. It is intended that the present disclosure be construed as including all such aspects, embodiments, modifications and alterations insofar as they come within the scope of the appended claims or the equivalents thereof.

What is claimed is:

1. A spiral wound membrane module, comprising, in an unwound condition, a perforated core having an axially extending internal bore; at least one membrane packet comprising a folded membrane sheet defining a first outer face, a first inner face, a second outer face and a second inner face, the fold of said folded membrane sheet being a leading edge of said membrane packet, and a feed sheet positioned between said first and second inner faces so as to be sandwiched by the folded membrane sheet, said folded membrane sheet comprising a predefined, compressible wedge-shaped fluid impermeable support coupled to said leading edge of said membrane packet; a first permeate screen adjacent said first outer face of said membrane sheet defining a first permeate channel; a second permeate screen adjacent said second outer face of said membrane sheet defining a second permeate channel.

2. The spiral wound membrane module of claim 1, wherein there are a plurality of membrane packets, each having a leading edge and a predefined compressible wedge-shaped fluid impermeable support coupled to each respective leading edge.

3. The spiral wound membrane module of claim 1, wherein said module is cylindrical in cross-section and has an outer surface of cured adhesive.

4. A method of potting a spiral wound membrane module, comprising:
    positioning the spiral wound membrane module of claim 1 into sealing relation with a mold cavity;
    introducing an adhesive into said mold cavity;
    applying a vacuum to said mold cavity;
    whereby said vacuum drives said adhesive into said first and second permeate channels; and
    allowing said adhesive to cure.

5. The method of claim 4, wherein the feed screen has four edges, and wherein a solid fluid impermeable border on at least three edges during the potting operation.

6. The spiral wound membrane module of claim 1, wherein said predefined compressible wedge-shaped fluid impermeable support is coupled to the leading edge of the membrane packet with an adhesive, by ultrasonic welding, by heat welding, or with ultra-violet glue.

7. The spiral wound membrane module of claim 1, wherein said predefined compressible wedge-shaped fluid impermeable support is made of a thermoplastic elastomer.

\* \* \* \* \*

UNITED STATES PATENT AND TRADEMARK OFFICE
CERTIFICATE OF CORRECTION

| | | |
|---|---|---|
| PATENT NO. | : 12,337,284 B2 | Page 1 of 1 |
| APPLICATION NO. | : 17/292981 | |
| DATED | : June 24, 2025 | |
| INVENTOR(S) | : Landry et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 384 days.

Signed and Sealed this
Sixteenth Day of December, 2025

John A. Squires
*Director of the United States Patent and Trademark Office*